US011318729B2

(12) United States Patent
Qi et al.

(10) Patent No.: US 11,318,729 B2
(45) Date of Patent: May 3, 2022

(54) FILM MATERIAL, AND PEELING DEVICE AND METHOD FOR FILM MATERIAL

(71) Applicants: Chengdu BOE Optoelectronics Technology Co., Ltd., Chengdu (CN); BOE TECHNOLOGY GROUP CO., LTD., Beijing (CN)

(72) Inventors: Fei Qi, Beijing (CN); Zhiliang Jiang, Beijing (CN); Hao Yan, Beijing (CN); Qingqing Yan, Beijing (CN); Erjin Zhao, Beijing (CN)

(73) Assignees: Chengdu BOE Optoelectronics Technology Co., Ltd., Chengdu (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/916,328

(22) Filed: Jun. 30, 2020

(65) Prior Publication Data

US 2021/0178743 A1    Jun. 17, 2021

(30) Foreign Application Priority Data

Dec. 17, 2019    (CN) .......................... 201911303901.7

(51) Int. Cl.
*B32B 43/00*    (2006.01)
*B32B 3/26*    (2006.01)
(Continued)

(52) U.S. Cl.
CPC ............ *B32B 43/006* (2013.01); *B32B 3/266* (2013.01); *B32B 7/12* (2013.01); *B32B 27/08* (2013.01);
(Continued)

(58) Field of Classification Search
CPC . B32B 38/10; B32B 43/006; Y10T 156/1132; Y10T 156/1174;
(Continued)

(56) References Cited

U.S. PATENT DOCUMENTS 9,731,492 B2 * 8/2017 Lee ...................... B32B 43/006
10,207,487 B1    2/2019 Hockemeyer et al.
(Continued)

FOREIGN PATENT DOCUMENTS

CN    105655487 B    10/2018
CN    109956085 A    7/2019
(Continued)

OTHER PUBLICATIONS

First Office Action for CN Patent Application No. 201911303901.7 dated Jun. 16, 2021.

*Primary Examiner* — Philip C Tucker
*Assistant Examiner* — Nickolas R Harm
(74) *Attorney, Agent, or Firm* — Thomas | Horstemeyer, LLP

(57) ABSTRACT

The present disclosure provides a peeling device and method for film material. The film material includes a first film layer, a second film layer, and a third film layer stacked in sequence, and the first film layer and the second film layer have bodies corresponding to the third film layer and protrusions. The peeling device is configured to peel off the first film layer and includes: an abutment divided into a first area configured to place the bodies of the first film layer and the second film layer and the third film layer, and a second area configured to place the protrusions of the first film layer and the second film layer; and a peeling mechanism configured to be coupled to the protrusion of the first film layer to separate the first film layer from the second film layer.

10 Claims, 4 Drawing Sheets

(51) Int. Cl.
*B32B 7/12* (2006.01)
*B32B 27/08* (2006.01)
*B32B 27/28* (2006.01)
*B32B 27/36* (2006.01)
*B32B 38/10* (2006.01)

(52) U.S. Cl.
CPC ............ *B32B 27/281* (2013.01); *B32B 27/36* (2013.01); *B32B 38/10* (2013.01); *B32B 2250/03* (2013.01); *B32B 2457/20* (2013.01); *Y10S 156/924* (2013.01); *Y10S 156/937* (2013.01); *Y10T 156/1132* (2015.01); *Y10T 156/1174* (2015.01); *Y10T 156/195* (2015.01); *Y10T 156/1944* (2015.01)

(58) Field of Classification Search
CPC ........... Y10T 156/1944; Y10T 156/195; Y10S 156/924; Y10S 156/937
See application file for complete search history.

(56) References Cited

U.S. PATENT DOCUMENTS

| | | | | |
|---|---|---|---|---|
| 2008/0236743 | A1* | 10/2008 | Kye | B32B 43/006 156/714 |
| 2014/0209250 | A1* | 7/2014 | Kawagoe | B32B 43/006 156/701 |
| 2014/0262053 | A1* | 9/2014 | Canale | H01L 21/67005 156/707 |
| 2014/0332150 | A1* | 11/2014 | Hirakata | B32B 43/006 156/247 |
| 2015/0151531 | A1* | 6/2015 | Ohno | H01L 51/524 156/755 |
| 2017/0077459 | A1* | 3/2017 | Choi | H01L 21/6838 |

FOREIGN PATENT DOCUMENTS

| | | |
|---|---|---|
| CN | 209454333 U | 10/2019 |
| TW | I382923 B | 1/2013 |

* cited by examiner

FILM MATERIAL, AND PEELING DEVICE AND METHOD FOR FILM MATERIAL

CROSS-REFERENCE TO RELATED APPLICATION

This application is based upon and claims priority to Chinese Patent Application No. 201911303901.7, filed on Dec. 17, 2019, the entire contents thereof are incorporated herein by reference.

TECHNICAL FIELD

The present disclosure relates to the field of display technology and, in particular, to a peeling device and method for film material.

BACKGROUND

During the manufacturing process of a display panel, some auxiliary film layers, such as a release film, are often needed. The release may isolate, fill, and protect other film layers during the manufacturing process of a film layer, and thereafter the release film is peeled off.

Generally, a backside of a substrate of a display panel is provided with a back protective film. The back protective film has three layers before attachment thereof, and the three layers include a middle layer which is a base film, an upper layer which is a release film for protecting a top surface of the base film, and a bottom layer which is a protective film for protecting a bottom surface of the base film. When attaching the base film to the backside of the substrate, the release film is peeled off first, and then the base film is attached. After the other steps are completed, the protective film is removed.

However, because the release film is thin, the release film may easily take away the underlying base film during being peeled off, which will damage the base film and affect the peeling efficiency.

It should be noted that the information disclosed in the above background part is only used to enhance the understanding of the background of the present disclosure and, therefore may include information that does not constitute the prior art known to those of ordinary skill in the art.

SUMMARY

The present disclosure provides a film material, a peeling device, and a method for film material.

An aspect of the present disclosure provides a peeling device for film material including a first film layer, a second film layer, and a third film layer stacked in sequence, wherein the first film layer and the second film layer have bodies corresponding to the third film layer and protrusions. The peeling device is configured to peel off the first film layer and includes:

an abutment divided into a first area configured to place the bodies of the first film layer and the second film layer and the third film layer, and a second area configured to place the protrusions of the first film layer and the second film layer; and a peeling mechanism configured to be coupled to the protrusion of the first film layer to separate the first film layer from the second film layer.

In some embodiments of the present disclosure, the peeling mechanism includes a roller, a surface of the roller having an adhesive, and the adhesive being configured to be adhered to the protrusion of the first film layer so that the first film layer is separated from the second film layer when the roller rotates.

In some embodiments of the present disclosure, a surface of the second area of the abutment is higher than a surface of the first area of the abutment in a thickness direction of the abutment.

In some embodiments of the present disclosure, a height difference between the surface of the second area of the abutment and the surface of the first area of the abutment is equal to a thickness of the third film layer.

In some embodiments of the present disclosure, each of the first area and the second area of the abutment has a plurality of through holes, and the peeling device for film material further includes: a negative pressure device coupled to the through holes, and configured to absorb the film material onto a surface of the abutment through the through holes.

In some embodiments of the present disclosure, a diameter of the through hole of the second area of the abutment is larger than that of the through hole of the first area of the abutment.

In some embodiments of the present disclosure, the diameter of the through hole of the second area of the abutment is 2 to 3 times the diameter of the through hole of the first area of the abutment.

In some embodiments of the present disclosure, wherein the diameter of the through hole of the second area of the abutment is 1000 µm-2000 µm, and the diameter of the through hole of the first area of the abutment is 300 µm-600 µm.

In some embodiments of the present disclosure, a density of through holes of the second area of the abutment is greater than that of the through holes of the first area of the abutment.

Another aspect of the present disclosure provides a peeling method for film material that uses a peeling device for film material including an abutment divided into a first area and a second area and a peeling mechanism. The peeling method includes:

providing the film material including a first film layer, a second film layer, and a third film layer stacked in sequence, wherein the first film layer and the second film layer have bodies corresponding to the third film layer and protrusions;

placing the film material on the abutment so that the bodies of the first film layer and the second film layer and the third film layer are located in the first area, and the protrusions of the first film layer and the second film are located in the second area; and coupling the peeling mechanism of the peeling device to the protrusion of the first film to separate the first film layer from the second film layer.

In some embodiments of the present disclosure, each of the first area and the second area of the abutment has a plurality of through holes, and the peeling device for film material further includes: a negative pressure device coupled to the through holes, and configured to absorb the film material onto a surface of the abutment through the through holes. The peeling method further includes covering the film material onto the through holes of corresponding areas, and absorbing the film material onto the abutment through the negative pressure device.

In some embodiments of the present disclosure, the peeling method further includes cutting off the protrusion of the second film layer.

In some embodiments of the present disclosure, the first film layer is a release film.

In some embodiments of the present disclosure, the second film layer is a composite film including a base layer and an adhesive layer, the third film layer is a protective film, the protective film covers a surface of the base layer, and the release film covers a surface of the adhesive layer.

In some embodiments of the present disclosure, the base layer is one of a polyimide layer and a polyethylene terephthalate layer, and the adhesive layer is a polysulfone amide layer.

Yet another aspect of the present disclosure provides a film material including a first film layer, a second film layer, and a third film layer stacked in sequence. The first film layer and the second film layer have bodies corresponding to the third film layer and protrusions, the bodies of the first film layer and the second film layer and the third film layer are configured to be placeable in a first area of an abutment of a peeling device for the film material, the protrusions of the first film layer and the second film layer are configured to be placeable in a second area of the abutment of the peeling device for the film material, and the protrusion of the first film layer is configured to be connectable to a peeling mechanism of the peeling device for the film material to separate the first film layer from the second film layer through the peeling mechanism.

In some embodiments of the present disclosure, the first film layer is a release film.

In some embodiments of the present disclosure, the second film layer is a composite film including a base layer and an adhesive layer, the third film layer is a protective film, the protective film covers a surface of the base layer, and the release film covers a surface of the adhesive layer.

In some embodiments of the present disclosure, the base layer is one of a polyimide layer and a polyethylene terephthalate layer, and the adhesive layer is a polysulfone amide layer.

In some embodiments of the present disclosure, the protrusion of the first film layer is stacked on the protrusion of the second film layer.

It should be noted that the above general description and the following detailed description are merely exemplary and explanatory and should not be construed as limiting of the present disclosure.

BRIEF DESCRIPTION OF THE DRAWINGS

The drawings herein are incorporated into the specification and constitute a part of the specification, show embodiments consistent with the present disclosure, and are used to explain the principles of the present disclosure together with the specification. Understandably, the drawings in the following description are only some embodiments of the present disclosure. Those of ordinary skill in the art may obtain other drawings based on these drawings without any creative effort.

DETAILED DESCRIPTION

Figure 1:
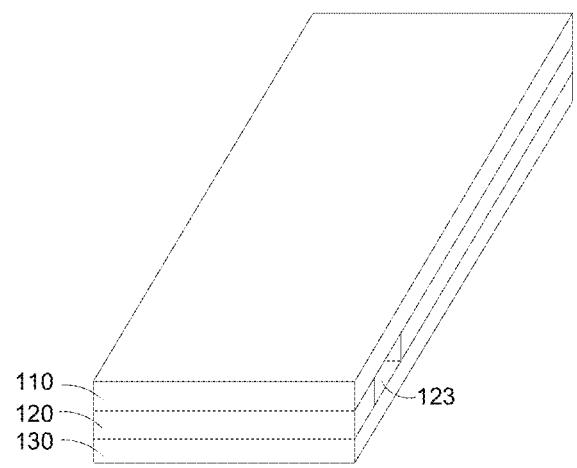
FIG. 1 is a schematic diagram of a structure of a film material to be peeled off in the related art.

Example embodiments will now be described more fully with reference to the drawings. However, the example embodiments may be implemented in various forms and should not be construed as being limited to the examples set forth herein. Rather, these embodiments are provided so that the present disclosure is more comprehensive and complete, and fully conveys the concept of the example embodiments to those skilled in the art. Same reference numerals in the drawings denote same or similar structures and thus, their detailed description will be omitted.

FIG. 1 is a schematic structural diagram of a back protective film of a flexible display panel in the related art. As shown in FIG. 1, the back protective film includes three layers from top to bottom, and the three layers include an upper layer which is a release film 110, a middle layer which is a base film 120, and a lower layer which is a protective film 130. Edges of the three layers are consistent with each other. In order to fold and package the flexible display panel, a slot 123 is provided at an end of the base film 120 to release compressive stress when the base film is bent.

Figure 2:
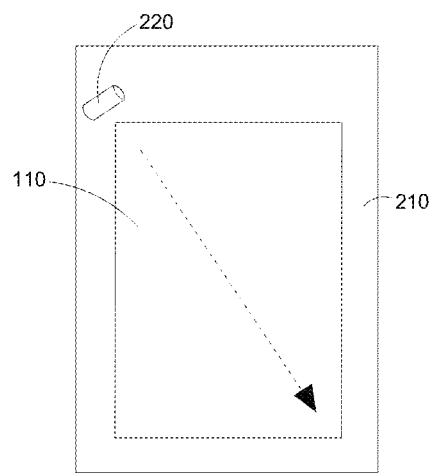
FIG. 2 is a schematic diagram of a film material to be peeled off and a peeling device in the related art.
Figure 3:
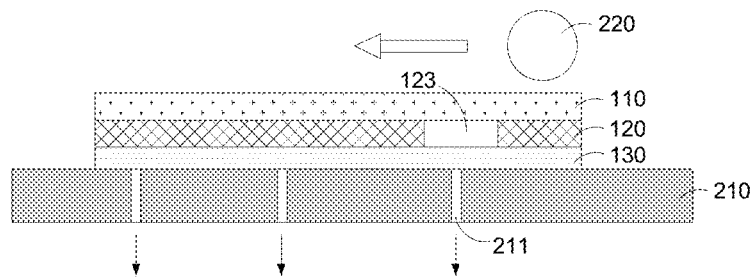
FIG. 3 is a schematic cross-sectional view of a release film before being peeled off in the related art.

Referring to FIGS. 2 and 3, a peeling method for the release film 110 from the back protective film includes: first placing the back protective film on an abutment 210 of a peeling device, adhering a roller 220 of the peeling device to a corner of the release film 110, and then rolling the roller 220 along a surface of the film material to take up the release film 110, thereby peeling off the release film 110 by the rolling of the roller 220.

Figure 4:
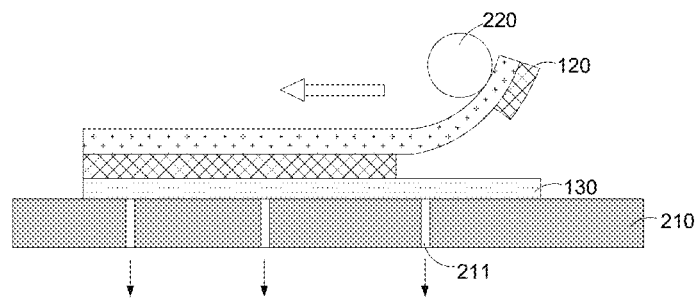
FIG. 4 is a schematic cross-sectional view of a peeling effect of a release film in the related art.

The base film 120 is easy to be taken up by the release film 110, since it is a flexible film for a flexible panel. In addition, the right end of the base film 120 in the figure is separated from a body of the film material and thus, the contact area thereof with the underlying protective film 130 is small. Thus, a fixing effect of this end by the protective film 130 is poor. Therefore, if the release film 110 is peeled off from this side, this end would be more easily peeled off with the release film 110, as shown in FIG. 4.

Figure 6:
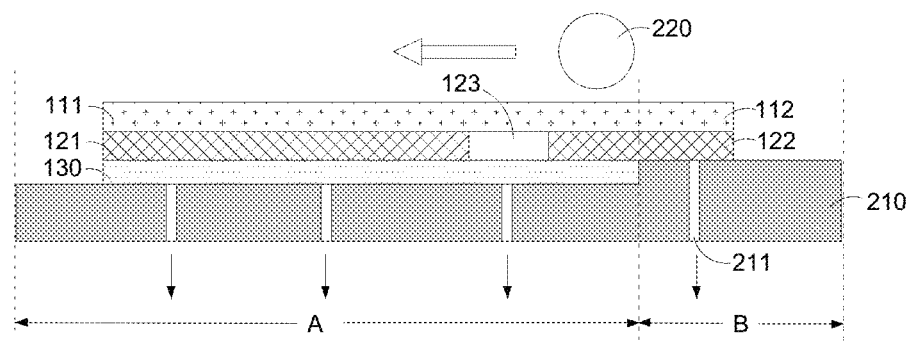
FIG. 6 is a schematic cross-sectional view of a film material to be peeled off and a peeling device in an embodiment.

An embodiment of the present disclosure provides a peeling device for film material, which can be used to peel off the release film 110 in the above film material structure without destroying the underlying film layer structure. Of course, the peeling device may also be used to peel off other film layers, such as the protective film 130. When the device is used for peeling, as shown in FIG. 6, a corresponding film material includes at least a first film layer, a second film layer, and a third film layer that are sequentially stacked. In the following description, for example, the first film layer is a release film 110, the second film layer is a base film 120, and the third film layer is a protective film 130.

The release film 110 and the base film 120 have bodies. Specifically, the release film 110 has a first body 111, the base film 120 has a second body 121, and both the first body 111 and the second body 121 correspond to the protective film 130. The release film 110 further has a first protrusion 112, and the base film 120 further has a second protrusion 122. It should be noted that positions of the first protrusion 112 and the second protrusion 122 are the same, that is, projections of the first protrusion 112 and the second protrusion 122 are overlapped with each other. At the same time, the two protrusions are protruded from corresponding bodies in directions away from the corresponding bodies along planes of corresponding films, that is, the two protrusions respectively are on the same horizontal plane as the corresponding bodies.

Figure 7:
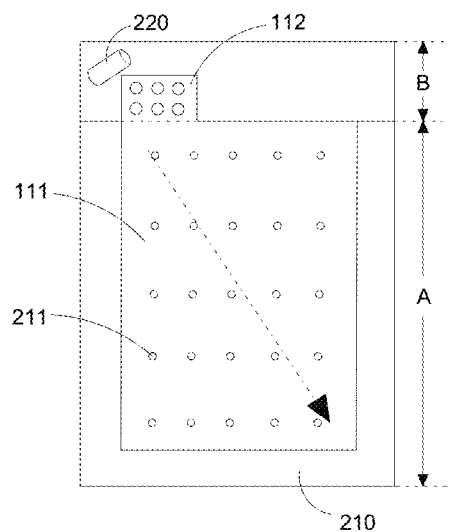
FIG. 7 is a schematic diagram of a film material to be peeled off and a peeling device in an embodiment.

As shown in FIGS. 6 and 7, the peeling device is used to peel off the first film layer, that is, the release film 110. The peeling device includes an abutment 210, a negative pressure device, and a peeling mechanism. The abutment 210 is divided into a first area A and a second area B. The first area A is used to place the first body 111 of the release film 110, the second body of the base film 120 and the protective film 130, and the second area B is used to place the protrusions of the release film 110 and the base film 120. Each of the first area A and the second area B of the abutment 210 has a plurality of through holes 211. The negative pressure device is coupled to the through holes 211 and is used to absorb the film material onto the surface of the abutment 210 through the through holes 211. The peeling mechanism is used to be coupled to the first protrusion 112 of the release film 110 to separate the release film 110 from the base film 120.

Figures 8, 9:
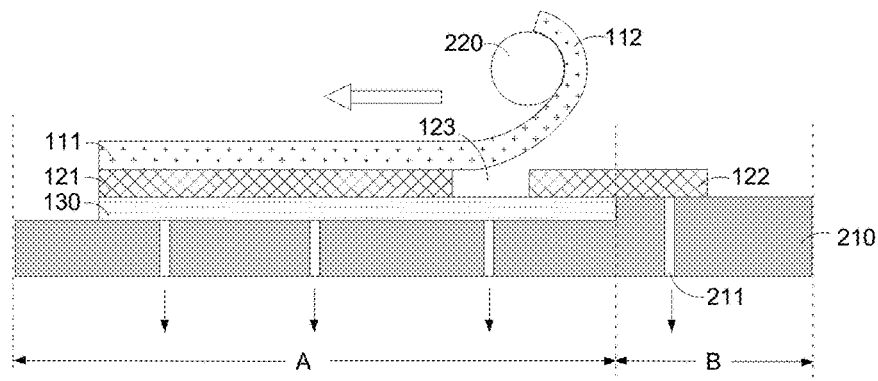
FIG. 8 is a schematic cross-sectional view of a peeling effect of a release film in an embodiment.
FIG. 9 is a flowchart of a peeling method for film material in an embodiment.

As can be seen from FIG. 8 that, in the abutment 210 according to an embodiment, the protective film 130 contacts the surface of the first area of the abutment 210, and is adsorbed onto the abutment 210 through the through holes 211 of the first area A. Also, the second protrusion 122 of the base film 120 contacts the surface of the second area B of the abutment 210 and is adsorbed onto the abutment 210 through the through holes 211 of the second area. As a result, the second protrusion 122 of the base film 120 is directly adsorbed onto the abutment 210 and thus, the fixing of the second protrusion 122 on the abutment 210 is firm. With the second protrusion 122 as a starting position for peeling, the base film 120 will not be easy to be taken up by the release film 110 which ensures the integrity of the base film 120 and also improves a peeling success rate of the release film 110.

The peeling device for film material according to an embodiment of the present disclosure will be described in detail below.

In an embodiment, the peeling mechanism includes a roller 220 which is rotatable, and a surface of the roller 220 has an adhesive to be adhered to the first protrusion 112 of the release film 110. The roller 220 rolls along a surface of the film material from the first protrusion 112, and the release film 110 is separated from the base film 120 gradually by the rolling of the roller 120. The adhesive on the surface of the roller 220 may be any material that can be adhered to the release film 110. In other embodiments, the peeling mechanism may also take other forms.

Figure 5:
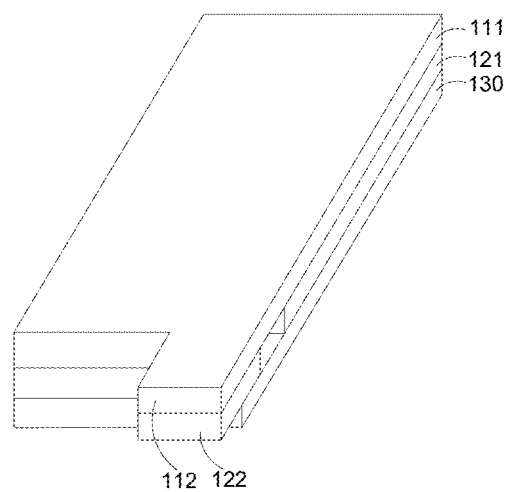
FIG. 5 is a schematic diagram of a structure of a film material to be peeled off in an embodiment.

In an embodiment, the first body 111 of the release film 110, the second body 121 of the base film 120, and the protective film 130 are all rectangular as shown in FIG. 5 or FIG. 7, and the first protrusion 112 of the release film 110 and the second protrusion 122 of the base film 120 are both rectangular as shown in the figures. Those skilled in the art can understand that the bodies and protrusions may have other shapes such as circular, triangular, and trapezoidal and, at the same time, the shape of the body and the shape of the protrusion may be the same or different, which is not limited in the present disclosure. Positions of the two protrusions are not limited in the present disclosure as well, and the protrusion may be disposed at any position around the body. Since the protrusion is used as a starting point for peeling, the protrusion may be disposed at a position so that the entire release film 110 is easy to be peeled off. For example, by taking that the film material is rectangular shown in the figure as an example, the two protrusions may be provided at one corner, and the peeling may proceed from the one corner to another corner along a diagonal line between the two corners, so that the release film 110 may be conveniently and completely peeled off. Sizes of the two protrusions are not limited in the present disclosure either, which may be set for easy peeling of the release film 110 or firm fixing of the base film 120. For example, taking a size of a common mobile phone display as an example, the size of the protrusion may be 10 mm×3 mm. However, it should be understood that the positions and sizes of the first protrusion 112 and the second protrusion 122 should be the same.

Those skilled in the art can also understand that the first area A and the second area B of the abutment 210 are used to place different parts of the release film 110 and the base film 120, therefore the shape of the connection between the two areas shall correspond to the shapes of the two parts. For example, in the figure, the body and the protrusion are both rectangular, and thus the connection between the first area A and the second area B is a straight line, which ensures that the two parts may be accurately placed at a corresponding position, and thus can be firmly adsorbed on the abutment 210.

In an embodiment, as shown in FIG. 6, the surfaces of the first area A and the second area B are not in a same plane, but have different heights. The surface of the second area B is higher than the surface of the first area A. When the film material is placed on the abutment 210, the bodies of the three film layers are all placed on the lower first area A, and the first protrusion 112 of the first release film 110 and the second protrusion 122 of the base film 120 are placed on the higher second area B. Since the protective film 130 does not have a protrusion, the higher second area B is used to support the first protrusion 112 and the second protrusion 122 in order to prevent connections between the protrusions and bodies in the upper two films from being bent, which may reduce damage to the film material due to a height difference. In an embodiment, when the height difference between the surface of the second area B and the surface of the first area A is equal to the thickness of the protective film 130, both the release film 110 and the base material film 120 may be in horizontal planes.

The abutment 210 may be made of any material such as metal and hard plastic. Those skilled in the art can understand that, when manufacturing the abutment 210, the first area A and the second area B may be directly manufactured into two areas with different heights. Alternatively, the first area A and the second area B may be first manufactured to be at a same horizontal plane, and then a higher part may be added to the second area B. The first area A and the second area B may be formed of a same material or different materials. In addition, the through holes 211 may be formed in the abutment 210 by any mechanical means such as punching and drilling, which is not specifically limited in the present disclosure.

In an embodiment, referring to FIG. 7, a diameter of the through hole 211 in the second area B of the abutment 210 is larger than a diameter of the through hole 211 in the first area A, so that the absorption force of the second area B to the second protrusion 122 of the base film 120 is relatively large, and thus the fixing of the base film is improved and the base film 120 is not easy to be taken up during the peeling of the release film 110. In an embodiment, the diameter of the through hole 211 of the second area B is 2-3 times the diameter of the through hole 211 of the first area A. If the diameter ratio is less than 2, the second area B has a small adsorption force to the second protrusion 122 of the base film 120, and the base film 120 is difficult to struggle against the pulling of the release film 110 and is easy to be peeled off; if the diameter ratio is greater than 3, the two protrusions of the release film 110 and the base film 120 is intended to be absorbed to be deformed, thereby destroying the structure of the film material, and at the same time, the release film 110 is difficult to be peeled off smoothly. In an embodiment, the diameter of the through hole 211 of the second area B may be in a range of 1000 μm-2000 μm. Specifically, the diameter of the second area B may be 1000 μm, 1200 μm, 1400 μm, 1600 μm, 1800 μm, 2000 μm, and the like. The diameter of the through hole 211 of the first area A may be in a range of 300 μm-600 μm. Specifically, the diameter of the first area A may be 300 μm, 400 μm, 500 μm, 600 μm, and the like. A specific value may be confirmed according to actual process needs, and will not be listed here one by one. When the diameters of the through holes 211 in the two areas are within the above ranges, it can not only have a good adsorption and fixing effect on the body and the protrusion, but also will not hinder the smooth release of the release film 110, which ensures a peeling success rate of the release film 110 and a complete structure of the base film 120.

In an embodiment, referring to FIG. 7, a density of the through holes 211 in the second area B is greater than a density of the through holes 211 in the first area A, so that so that the absorption force of the second area B to the second protrusion 122 of the base film 120 is relatively large and thus, the fixing of the base film 120 is improved and the base film 120 is not easy to be taken up during the peeling of the release film 110. The density of through holes 211 refers to the number of through holes 211 per unit area. Specifically, the number of through holes 211 per unit area in the second area B is greater than the number of through holes 211 per unit area in the first area A.

In an embodiment, the negative pressure device may be any device that can provide negative pressure so that the film material may be attached to the abutment 210. For example, the negative pressure device may be a vacuum pump. In addition to the above structure, the peeling device for film material according to an embodiment may further include other components, such as various connection structures, a motor, and a chassis that realize a peeling function, which will not be described in detail here.

The above peeling device for film material may be applied to various film materials. For example, the release film 110 may be release films of various materials such as PE, OPP, BOPET, BOPP, PC, PS, and PMMA. The base film 120 may be a composite film (not shown) including a base layer and an adhesive layer. The base layer is in contact with the protective film 130 and the adhesive layer is in contact with the release film 110. The material of the base layer may include polyimide (PI) or polyethylene terephthalate (PET). The polyimide may be made into a flexible film, and thus is suitable for a flexible display panel; the polyethylene terephthalate may be made into a rigid film, and thus is suitable for a non-flexible display panel. The material of the adhesive layer may include polysulfone amide (PSA), which is used to adhere the base layer to a backplane of a panel. The peeling device of the present disclosure can achieve an ideal effect when peeling off the release film 110 of the PET film or PI film. The thickness of the PET film is generally 75 μm, and the thickness of the PI film is usually 25 μm or thinner. For the thinner PI film, it is more suitable to use the peeling device in the embodiment for peeling, which can effectively prevent the PI film from being peeled off along with the peeling of the release film 110. Of course, the base film 120 may also be films of other structures or materials, which will not be listed here one by one. The material of the protective film 130 is not limited in the present disclosure, which may be any film capable of protecting the PI film.

It should be noted that the film material in the above embodiment has a slot 123. However, the peeling device of the present disclosure is also applicable to a film material without the slot 123.

A peeling method for film material of the present disclosure will be described below by taking the above film material as an example. Referring to FIG. 9, the method includes the following steps.

In step S100, the above-mentioned film material as shown in FIG. 5 is provided.

In step S200, the film material is placed on the abutment 210, so that the first body 111 of the release film 110, the second body 121 of the base film 120, and the protective film 130 are located in the first area A, the first protrusion 112 of the release film 110 and the second protrusion 122 of the base film 120 are located in the second area B, and the bodies and the protrusions cover the through holes 211 in the corresponding areas.

In step S300, the negative pressure device (for example, a vacuum pump) is used to absorb the film material onto the abutment 210.

In step S400, the roller 220 is adhered to the first protrusion 112 of the release film 110 and the roller 220 is rotated, so that the roller 220 separates the release film 110 from the base film 120 during the rotation to peel off the release film 110.

For the specific structures, materials and the like of the film material and device used in the above peeling method, please refer to the foregoing description, which will not be repeated here.

Further, the embodiment may further include step S500 of cutting off the second protrusion 122 of the base film 120, so that the base film 120 may match the shape of a display panel. This step may be performed after step S400, or may be performed in a subsequent process, which is not specifically limited in the present disclosure.

The above is an example of peeling the release film in the three-layer film structure of the back protective film commonly used in a display panel. In an embodiment, the peeling device and method for film material can also be used to peel off a first film of a four-layer film, a five-layer film or a more-layer film. At the same time, it can also be used to peel off other film than the release film, which will not be listed here one by one.

Although in the specification, relative terms such as "on" and "under" are used to describe the relative relationship between one component and another component shown, these terms used in the specification are only for convenience of description, for example, according to example directions shown in the drawings. It can be understood that if a device as shown is turned upside down, then a component described as "on" will become the component as "under." When a structure is "on" another structure, it may mean that the structure is integrally formed on the other structure, or that the structure is disposed "directly" on the other structure, or that the structure is disposed "indirectly" on the other structure through another structure.

The terms "a", "an", "the", "said", and "at least one" are used to indicate the presence of one or more elements/components/etc. The terms "include" and "have" are used to indicate an open-ended inclusion and that there may be additional elements/component/etc. in addition to the listed elements/components/etc.

Other embodiments of the present disclosure will be apparent to those skilled in the art from consideration of the specification and practice of the present disclosure disclosed herein. The present disclosure is intended to cover any variations, uses, or adaptations of the present disclosure, which are in accordance with the general principles of the present disclosure and include common knowledge or conventional technical means in the art that are not disclosed in the present disclosure. The specification and embodiments are illustrative, and the real scope and spirit of the present disclosure is defined by the appended claims.

What is claimed is:

1. A peeling device for film material, the film material comprising a first film layer, a second film layer, and a third film layer stacked in sequence in a stacking direction, wherein the first film layer and the second film layer have bodies and protrusions, and projections of the bodies of the first film layer and the second film layer on a plane in the stacking direction coincide with a projection of the third film layer on the plane in the stacking direction, the peeling device being configured to peel off the first film layer and comprising:

an abutment divided into a first area configured to place the third film layer and the bodies of the first film layer and the second film layer, and a second area configured to place the protrusions of the first film layer and the second film layer; and a peeling mechanism configured to be coupled to the protrusion of the first film layer to separate the first film layer from the second film layer, wherein each of the first area and the second area of the abutment has a plurality of through holes; and the peeling device for film material further comprises a negative pressure device coupled to the through holes and configured to absorb the film material onto a surface of the abutment through the through holes, and wherein a diameter of a through hole of the second area of the abutment is larger than that of a through hole of the first area of the abutment.

2. The peeling device for film material according to claim 1, wherein:
the peeling mechanism comprises a roller;
a surface of the roller has an adhesive; and
the adhesive is configured to be adhered to the protrusion of the first film layer such that the first film layer is separated from the second film layer when the roller rotates.

3. The peeling device for film material according to claim 1, wherein a surface of the second area of the abutment is higher than a surface of the first area of the abutment in a thickness direction of the abutment.

4. The peeling device for film material according to claim 1, wherein the diameter of the through hole of the second area of the abutment is 2 to 3 times the diameter of the through hole of the first area of the abutment.

5. The peeling device for film material according to claim 1, wherein a density of through holes of the second area of the abutment is greater than that of the through holes of the first area of the abutment.

6. A peeling method for film material, which uses a peeling device for film material comprising an abutment divided into a first area and a second area and a peeling mechanism, wherein the peeling method comprises:

providing the film material, the film material comprising a first film layer, a second film layer, and a third film layer stacked in sequence in a stacking direction, wherein the first film layer and the second film layer have bodies and protrusions, and projections of the bodies of the first film layer and the second film layer on a plane in the stacking direction coincide with a projection of the third film layer on the plane in the stacking direction;

placing the film material on the abutment, such that the third film layer and the bodies of the first film layer and the second film layer are located in the first area, and the protrusions of the first film layer and the second film are located in the second area;

coupling the peeling mechanism to the protrusion of the first film to separate the first film layer from the second film layer, wherein each of the first area and the second area of the abutment has a plurality of through holes; the peeling device for film material further comprises a negative pressure device coupled to the through holes and configured to absorb the film material onto a surface of the abutment through the through holes; and a diameter of a through hole of the second area of the abutment is larger than that of a through hole of the first area of the abutment, covering the film material onto the through holes; and
absorbing the film material onto the abutment through the negative pressure device.

7. The peeling method for film material according to claim 6, wherein the peeling method further comprises cutting off the protrusion of the second film layer.

8. The peeling method for film material according to claim 6, wherein the first film layer is a release film.

9. The peeling method for film material according to claim 8, wherein:
the second film layer is a composite film comprising a base layer and an adhesive layer;
the third film layer is a protective film;
the protective film covers a surface of the base layer; and
the release film covers a surface of the adhesive layer.

10. The peeling method for film material according to claim 9, wherein the base layer is one of a polyimide layer and a polyethylene terephthalate layer, and the adhesive layer is a polysulfone amide layer.

* * * * *